United States Patent [19]
Scifres

[11] Patent Number: 5,566,196
[45] Date of Patent: Oct. 15, 1996

[54] MULTIPLE CORE FIBER LASER AND OPTICAL AMPLIFIER

[75] Inventor: Donald R. Scifres, San Jose, Calif.

[73] Assignee: SDL, Inc., San Jose, Calif.

[21] Appl. No.: 330,262

[22] Filed: Oct. 27, 1994

[51] Int. Cl.$^6$ ............................................. H01S 3/30
[52] U.S. Cl. .................................... 372/6; 372/68
[58] Field of Search ............................... 372/6, 68

[56]  References Cited

U.S. PATENT DOCUMENTS

| | | | |
|---|---|---|---|
| 4,778,238 | 10/1988 | Hicks | 372/6 |
| 4,886,333 | 12/1989 | Hicks | 372/6 |
| 4,938,561 | 7/1990 | Grasso et al. | 372/6 |
| 5,087,108 | 2/1992 | Grasso et al. | 385/27 |
| 5,121,460 | 6/1992 | Tumminelli et al. | 372/6 |
| 5,218,665 | 6/1993 | Grasso et al. | 385/142 |
| 5,291,501 | 3/1994 | Hanna | 372/6 |
| 5,317,575 | 5/1994 | Aniano | 372/6 |
| 5,373,576 | 12/1994 | Minns et al. | 372/6 |

*Primary Examiner*—Rodney B. Bovernick
*Assistant Examiner*—Robert E. Wise
*Attorney, Agent, or Firm*—Thomas Schneck

[57]  ABSTRACT

A fiber laser or amplifier in which the optical fiber gain medium has two or more nonconcentric core regions, each of which is capable of gain or lasing when optically pumped. The fiber may be single clad or double clad, with multiple core regions embedded within a common cladding region or within separate cladding regions. The core regions may be arranged in a linear, closely spaced hexagonal, rectangular matrix or some other configuration and positioned symmetrically or noncentrosymmetrically, centered or off-center within the core region or regions. The spacing between neighboring core regions may be far enough apart to minimize optical interaction between cores for independent light amplifying or laser action or be close enough for phase-locked operation of the multiple cores to occur. The cores may be doped with the same or different active ionic species, of which one or more could be upconverting ions. If several dopants are present, the multiple pump wavelengths could be provided simultaneously or one could be selected for simultaneous multiple wavelength amplification or lasing or selected single wavelength amplification or lasing. The multi-core output can be imaged by a lens or collimated by a lens array then focused to a spot.

57 Claims, 4 Drawing Sheets

MULTIPLE CORE FIBER LASER AND OPTICAL AMPLIFIER

TECHNICAL FIELD

The present invention relates to optical fiber lasers and amplifiers, and in particular to the structure of the optical fiber waveguide that forms the active medium for such devices.

BACKGROUND ART

In U.S. Pat. No. 5,291,501, Hanna describes a double-clad fiber laser in which a single mode central core is doped with a first laser active material, such as thullium ($Tm^{3+}$), a multimode inner cladding surrounding the core is doped with a second laser active material, such as neodymium ($Nd^{3+}$), and an outer cladding surrounds the inner cladding. The three fiber regions, i.e. the central core, inner cladding and outer cladding, are arranged concentrically. The inner cladding is optically pumped with a multimode laser diode array pump source, while the central core is pumped by the laser emission from the inner cladding.

In U.S. Pat. Nos. 5,087,108 and 5,218,665, Grasso et al. describe an erbium-doped fiber amplifier employing an active core doped with erbium and receiving both pump ($\lambda_p$=980 nm) and signal ($\lambda_s$=1550 nm) light, and a passive core absorbing spontaneous light emissions ($\lambda\approx1536$ nm) from the active core. The two cores are arranged parallel to each other and are constructed so that the spontaneously emitted radiation leaks out of the active core into the passive core. In this way, the spontaneous emission which corresponds to a narrow emission peak of great intensity in the gain spectrum of erbium can be attenuated, so that the signal light which is amplified can be at a wavelength corresponding to a lower intensity but broader portion of the gain spectrum. The wavelength tolerances for the semiconductor lasers selected to provide the signal light need not, therefore, be as stringent.

One problem limiting the output power and efficiency of fiber lasers and amplifiers is stimulated Brillouin scattering. This nonlinear optical effect results from the interaction of the laser light with acoustic waves in the fiber medium through which the laser light is propagating, producing inelastic backscattering of the light together with a frequency shift equal to the frequency of the acoustic waves. The backward propagating light is amplified at the expense of the forward propagating light. Further, the acoustic waves may also be amplified by this effect, generating an acoustic intensity that can easily damage the fiber medium. These deleterious effects limit the useful light output intensities that can be produced in a laser or amplifier fiber core.

It is an object of the invention to provide an optical fiber laser or amplifier medium with increased output power without producing nonlinear optical effects such as Brillouin scattering.

DISCLOSURE OF THE INVENTION

The object is met by a fiber laser or amplifier that uses an optical fiber with two or more generally parallel, nonconcentric doped core regions, each of which is capable of lasing or gain when excited by pump light. The use of multiple cores spreads the light over a larger area of the fiber, instead of limiting it to just a single central core, reducing the laser power density, and thereby reducing or eliminating the nonlinear optical effects that would otherwise occur at high light intensities. This increases the reliability of the fiber laser, preventing saturation of the output power and preventing fiber damage. The invention can also be thought of as a monolithic fiber laser array in which each fiber core acts as a separate laser or gain element of the array incorporated in a single optical fiber.

The optical fiber may be a single clad or double clad fiber. The multiple core regions may all be embedded within the same cladding region or alternately may each be embedded within separate cladding regions. The double cladding region,-when employed, may be circular, rectangular or elliptical in cross-section. The core regions may be arranged symmetrically with respect to the center of the cladding region in which they are embedded; or alternatively may be noncentrosymmetrically arranged. Likewise, where each core region has its own separate cladding region, the core regions may be either centered or positioned off-center within its cladding. The core regions may be arranged in a linear configuration, a closely spaced hexagonal configuration, a rectangular matrix configuration, or some other configuration of core regions. The spacing between neighboring core regions may be far enough apart that light propagating in one core intersects only minimally, if at all, with light propagating in the other cores, so that each core forms a completely independent laser or light amplifying emitter within the fiber. Alternatively, neighboring core regions may be spaced sufficiently close (relative to the refractive index difference between core and cladding regions) that interaction of the light does occur, thereby forming a phase-locked array of laser emitters in the fiber. A lens may be positioned in the path of light output from all of the core regions of the fiber so as to image the output light, or a lens array with a plurality of lens elements may be positioned with a different lens element of the array in front of each core to collimate the emitted light while a focusing lens, positioned after the lens array, focuses the collimated light into a single diffraction-limited spot of high brightness.

The core regions are doped with an active lasing ionic species. All of the cores may have the same species of dopant or different cores may have different dopants. At least one of the dopants may be an upconverting ionic species. The pump light is coupled into the optical fiber to excite the dopant species in the core regions to lase. If several different dopant species are present, multiple pump wavelengths are provided. This permits either simultaneous lasing at several wavelengths from the multiple cores or selected lasing from one or more of the cores, depending on which pump wavelengths are provided at any given time. In the case of double-clad fibers, the pump light is launched into the inner cladding region or regions. If different cladding regions have cores with different dopants, different pump light wavelengths may be provided to the different cladding regions.

BEST MODE OF CARRYING OUT THE INVENTION

With reference to FIGS. 1–5, the fiber lasers and fiber amplifiers of the present invention employ optical fibers having multiple nonconcentric core regions, 11, 21, 31, 41a–c and 51a–e. Each core region is doped with an active ionic species, such as one or more rare earth ions, which can be excited by pump light provided to the core regions to produce gain or lasing action. One or more of the ion dopants may be capable of undergoing an upconversion excitation process so as to lase at a wavelength which is shorter than the pump wavelength. The multiple core regions need not be doped with the same active ionic species.

Figure 1:
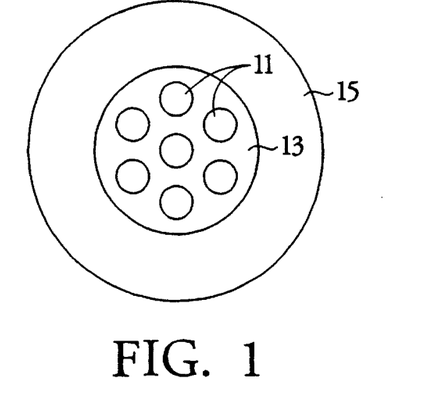
FIGS. 1–6 are end views of multi-core optical fibers for use as active media in fiber lasers of the present invention.

In FIG. 1, the core regions 11 are contained within a common inner cladding region 13, which is, in turn, contained within an outer cladding 15 of the optical fiber active medium. The core regions 11 and cladding region 13 have a circular cross-section and the core regions 11 are arranged in a closely spaced hexagonal configuration. The core regions 11 may have a diameter of about 10 µm or less so as to support only a single spatial mode of light propagation, or alternately, may have a larger diameter in order to support multiple modes of propagation. The core regions 11 may be spaced with their core edges within about 2 µm of neighboring core regions in order to allow interaction of the evanescent light for phase locking of the core regions. Neighboring cores can even be so close that their edges touch each other, or even merge and overlap slightly. The exact spacing maximum between neighboring core regions 11 for phase coupling to occur depends on the strength of the light guiding and, hence, upon the refractive index difference between core and inner cladding regions 11 and 13. A greater difference and stronger light guiding requires closer spacing for phase locked operation to take place. Alternatively, the core regions 11 may be spaced further apart for minimal light interaction, allowing independent operation of the different core regions 11. Core regions 11 with different dopant ions and different lasing wavelengths generally cannot be phase locked but may be closely spaced in order to simulate a multiple-colored source, for example, when red, green and blue upconversion core regions are used in the multiple core fiber configuration.

Figure 2:
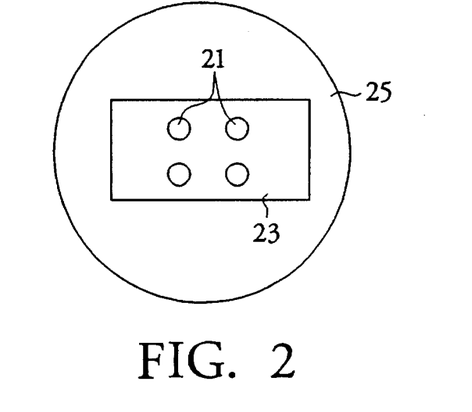
Figure 3:
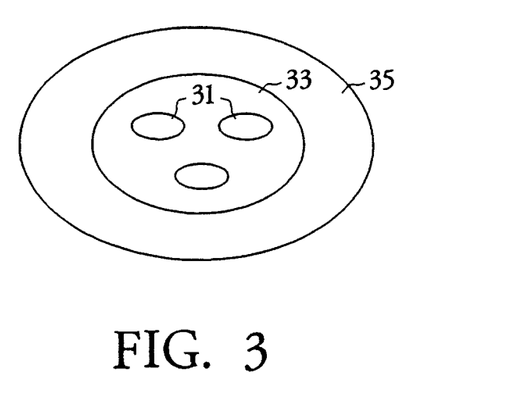
Figure 4:
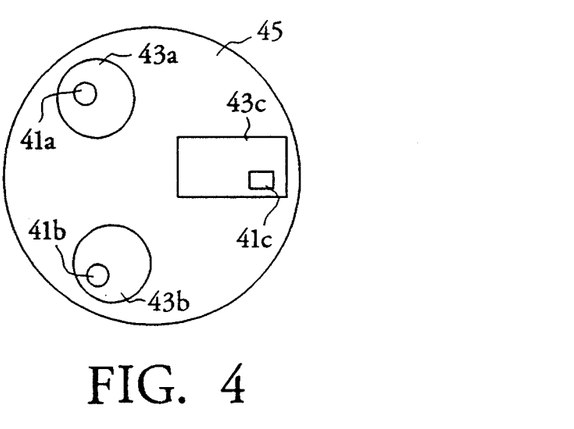
Figure 5:
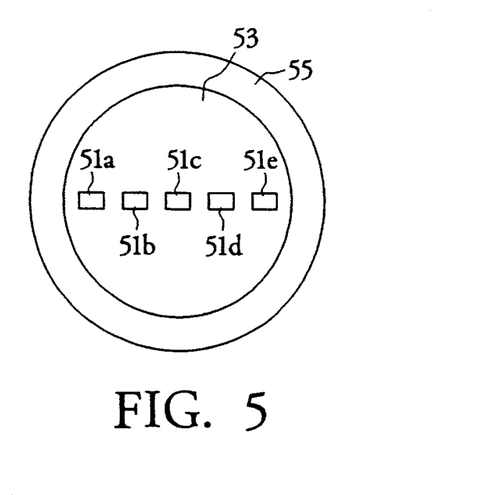

In FIG. 2, the core regions 21 have circular cross-sections and inner cladding region 23 has a rectangular cross-section. In FIG. 5, the core regions 51a–51e have rectangular cross-sections, while the cladding region 53 has a circular cross-section. In FIG. 4, two of the core regions 41a and 41b and their corresponding cladding regions 43a and 43b have circular cross-sections, while a third core region 41c and its cladding 43c have rectangular cross-sections. In FIG. 3, the core regions 31 and inner cladding region 33 have elliptical cross-sections. The outer claddings 25, 35, 45 and 55 in these embodiments can have any shape. The figures not only illustrate that the cores and claddings can have any of several shapes, but also illustrate that the core and cladding regions in a fiber need not be of the same shape. That is, circular cores can be found within rectangular or elliptical claddings, as in FIG. 2, and rectangular or elliptical cores can be found within circular claddings, as in FIG. 5. Also, different cores and claddings in the same fiber can have different cross-sectional shapes, as seen in FIG. 4. Rectangular and elliptical shapes may provide a greater degree of polarization preservation of the propagating light than the circular cross-section of regions 11 and 13 in FIG. 1. The oblong (rectangular or elliptical) shape of the inner cladding regions 23, 33 and 43c also often better fits the shape of pump beam emitted from high power laser diode sources, such as monolithic laser arrays and flared MOPAs, for easier coupling of pump light into the optical fiber medium in a compact structure. In addition, the pump light guided in the inner clad is better coupled into the core when noncircularly-symmetric inner clad regions are used. The fibers can be produced by drawing preformed material of the appropriate shape. The fiber structure in FIG. 3 can also be formed more easily by squashing a circular fiber as in FIG. 1. The elliptical cores can be oriented so that the major axes are all parallel to each other, as shown in FIG. 3, for accepting, amplifying and outputting light having the same polarization. Alternatively, one or more of the cores can be oriented orthogonally to one or more other cores for accepting, amplifying and outputting light with orthogonal polarizations. The core orientations can also be at other specified angles relative to each other, or even be randomly oriented, to provide different sets of light polarizations.

In FIG. 4, the core regions 41a, 41b and 41c are each contained within a separate inner cladding region 43a, 43b and 43c, which, in turn, are commonly contained within an outer cladding 45. This fiber structure is representative of many other similar structures which permit multiple pump sources to be separately coupled to different inner cladding regions. The pump sources and inner cladding regions need not be associated in a one-to-one correspondence, nor do the inner cladding regions and core regions need to be associated in a one-to-one correspondence. There can be more than one core region per inner cladding region and more than one pump source per inner cladding region. Likewise, there need not be a one-to-one correspondence between pump source and core region, as one or more of the core regions may be doped with multiple lasing ionic species, each requiring its own pump source.

In FIG. 5, a linear array of lasing core regions 51a–51e are disposed within an inner cladding region 53 embedded within an outer cladding 55 of the optical fiber. The array may be used to form a line of imaged laser light spots, e.g., for laser cutting applications. Other configurations such as a rectangular matrix of core regions, as in FIG. 2, could also be produced.

Figure 6:
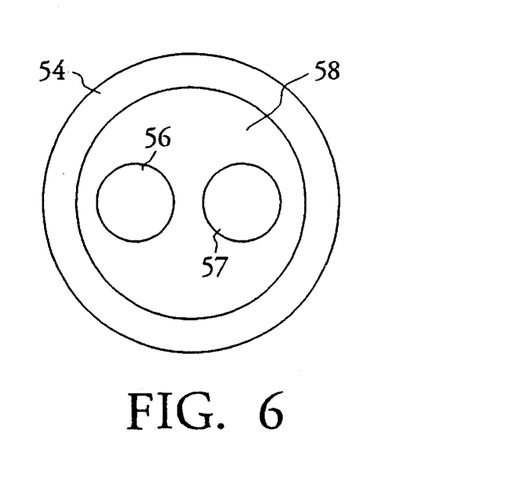

With reference to FIG. 6, as previously noted, the light propagating in one core region may be evanescently coupled with light propagating in neighboring core regions, provided the core regions are spaced sufficiently close to one another, to provide phase-locked laser operation. Other reasons for allowing evanescent optical coupling between neighboring core regions include formation of an active splitter amplifier and providing a laser core to achieve high flux pumping of an amplifier core. FIG. 6 shows a dual-clad optical fiber 54 having a pair of active core regions 56 and 57 embedded within an inner cladding region 58. Both core regions are doped with active ionic species, such as rare earth ions, which are capable of providing optical gain by means of stimulated emission when excited by pump light. In one example, core 56 may be doped with neodymium and the fiber ends coated for reflection at 1.03 µm or 1.06 µm. The coating at the input end is also nonreflective or has low reflectivity at the 0.81 µm pump wavelength to permit injection of the pump light from a laser diode source. When pumped, the core 56 forms a neodymium fiber laser. The second core 57 may be doped with praseodymium. The fiber end coatings should be nonreflective at 1.3 µm, the emission wavelength of the praseodymium-doped core 57. The neodymium laser light is evanescently coupled into the praseodymium-doped core 57 providing a high flux pump for the core 57. A 1.3 µm wavelength light signal injected into the core 57 is then amplified. In another example, both cores 56 and 57 are doped with the same active ionic species, such as erbium. Pump light is injected into the inner cladding 58 and excites both core regions 56 and 57. A 1.55 µm wavelength light signal is injected into only one of the cores 56 or 57 and is amplified. The signal light in that core is also evanescently coupled into the other neighboring core and is also amplified there. Amplified signal light emerges from both core regions 56 and 57 at the output end of the fiber.

Figure 7:
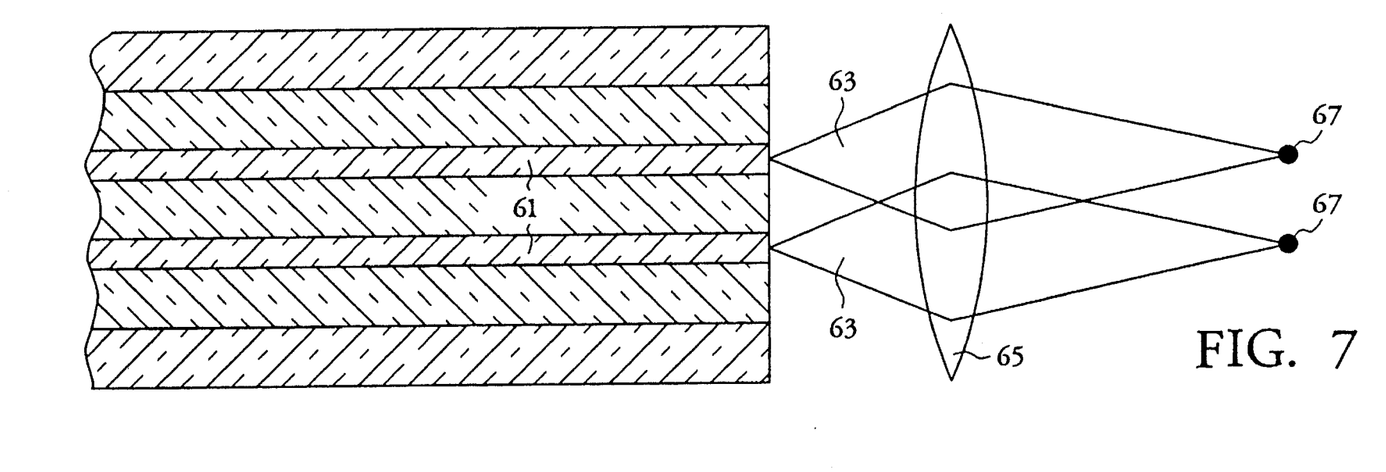
FIGS. 7 and 8 are side sectional views of optical fiber lasers of the present invention in combination with two imaging lens systems for such lasers.
Figure 8:
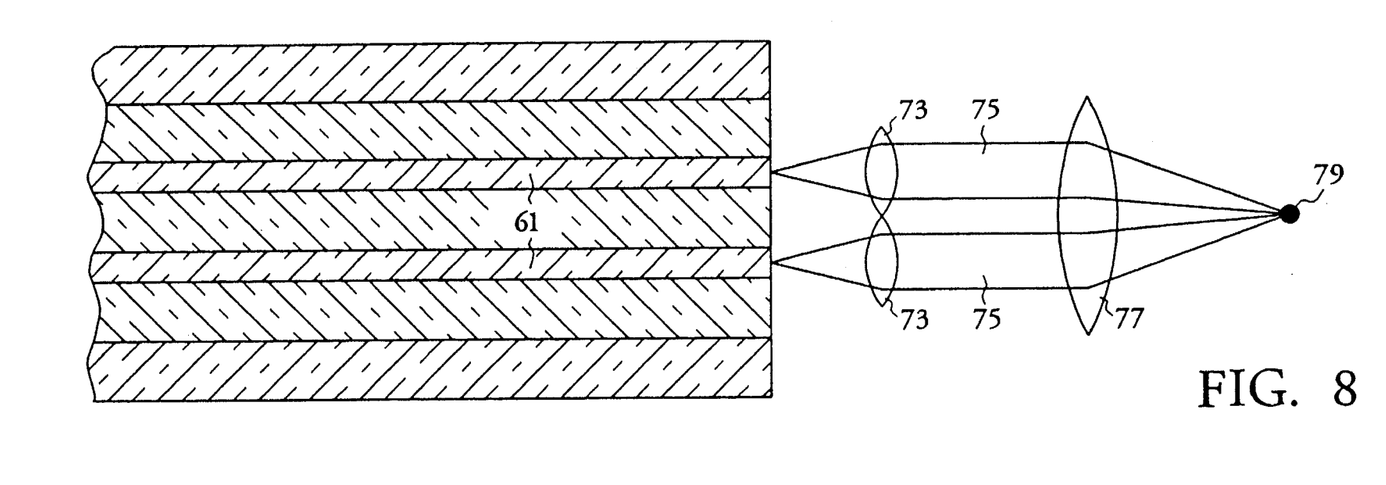

With reference to FIG. 7, the laser light output 63 from each core region 61 may be imaged by a lens or lens system 65 located in the path of the light beams 63 to form a corresponding plurality of laser light spots 67 arranged in substantially the same configuration as that of the core regions 61. Alternatively, as seen in FIG. 8, each core region 71 in the fiber may be separately collimated by a lens element 73 of a lens array. The collimated light 75 may then be focused by a lens 77 disposed in the collimated light path of all of the core regions 71 into a single high power spot 79.

Figure 9:
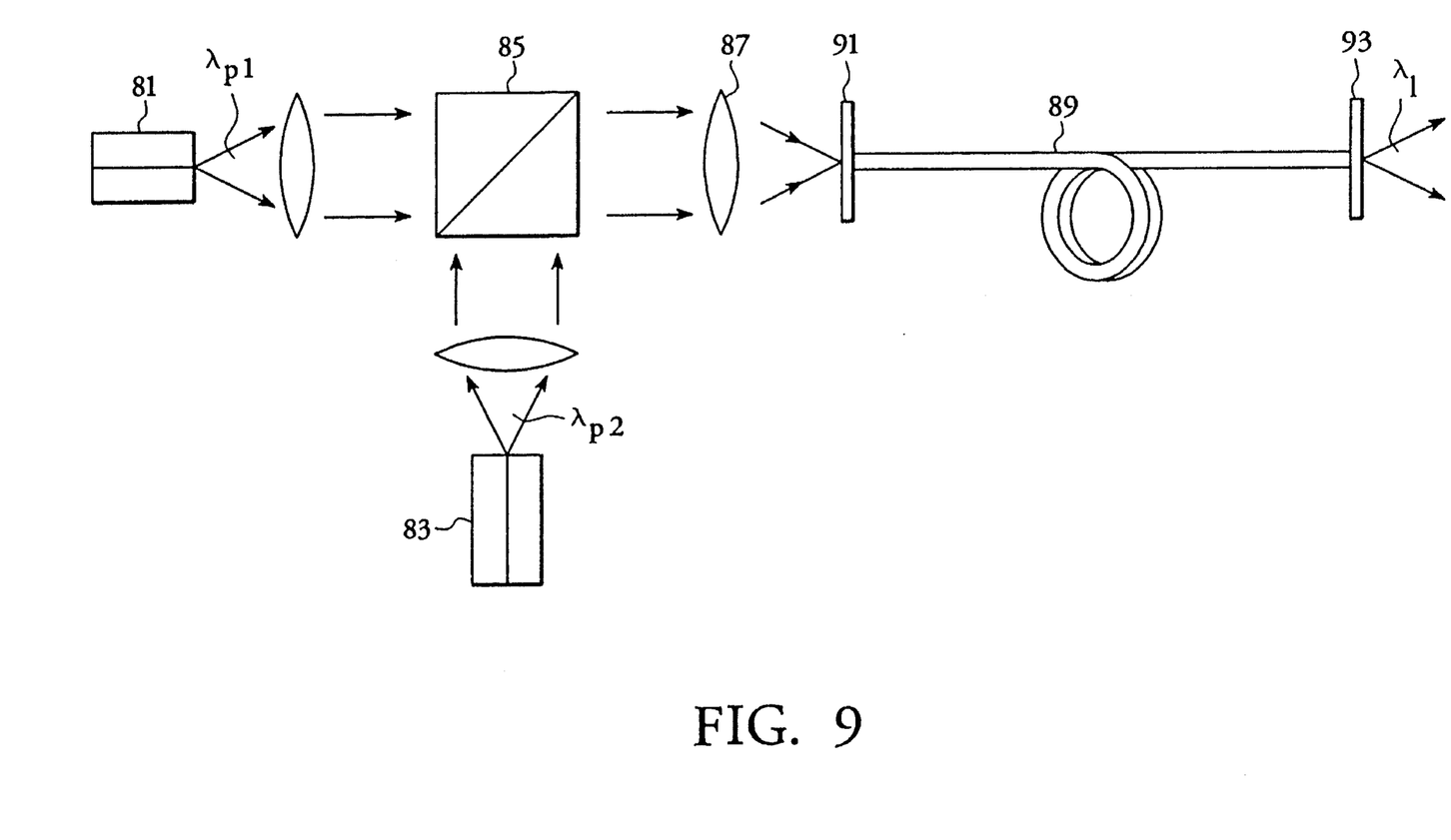
FIG. 9 is a schematic side view of a fiber laser of the present invention.

With reference to FIG. 9, a fiber laser of the present invention includes one or more pump sources 81 and 83 providing pump light of one or more wavelengths $\lambda_{p1}$, $\lambda_{p2}$, etc., which may be directed by a wavelength-division beamsplitter 85 or other beam combining means through focusing optics 87 into one or more inner cladding regions of a multi-core laser fiber 89. Reflective mirror coatings on the fiber ends or external mirrors 91 and 93 abutting the fiber 89 admit the pump wavelengths $\lambda_{p1}$ and $\lambda_{p2}$ but establish a laser cavity for the lasing wavelength or wavelengths $\lambda_1$. The focusing optics 87 may be a graded index (GRIN) lens, in which case the mirror 91 may be a reflective coating the one end of the GRIN lens abutting the input end of the fiber 89. The mirror 93 is partially reflective to couple laser light out of the fiber 89.

Both pump sources 81 and 83 in FIG. 9 may operate simultaneously to generate multiple laser wavelengths at the same time. Alternatively, only one of the pump sources 81 or 83 may be operated to generate only a selected laser wavelength from the fiber 89. The relative pump powers from the sources 81 and 83 might also be adjusted to provide selected laser output powers of each wavelength, e.g., to alter color balance in a multiple pump wavelength red-green-blue generating tri-core optical fiber.

Figure 10:
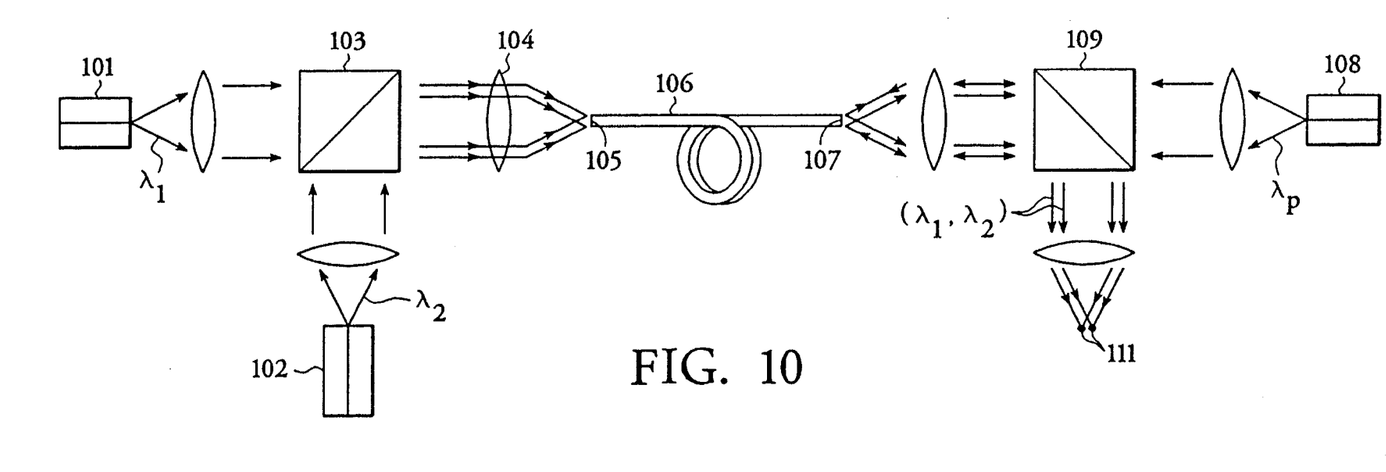
FIG. 10 is a schematic side view of a fiber amplifier of the present invention.

In FIG. 10, an optical fiber amplifier with multiple core regions is injected with signal light from two or more laser signal sources 101 and 102, such as laser diodes, with wavelengths $\lambda_{p1}$ and $\lambda_{p2}$. A dichroic beamsplitter 103 combines the light from both sources into parallel closely spaced apart or overlapping light paths, which is then focused by a lens 104 onto the fiber end 105 for coupling into respective spaced apart core regions within the fiber 106. A laser pump source 108 emitting light at a pump wavelength $\lambda_p$ injects light into the fiber 106, here shown as being coupled through the opposite end 107 of the fiber 106. The signal light is amplified as it propagates within the fiber 106 and is emitted from the end 107, which is suitably coated to suppress reflective feedback at the wavelengths $\lambda_1$ and $\lambda_2$ of the signal light. A dichroic beamsplitter 109 separates the amplified signal light from the incoming pump light. The amplified light may then be focused by a lens 110 to two or more spots 111 or coupled into a multicore light transmission fiber.

A similar optical system of lenses and beam-splitters can be constructed to provide an amplifier in which one signal to be amplified is injected at one end of the fiber into one core region and a second light signal to be amplified is injected at the opposite end of the fiber into another core region allowing two-way communication along the same fiber. Pump light can be injected into the fiber cladding from either or both ends of the fiber amplifier. The optical signals can be either of the same or different wavelengths.

Figure 11:
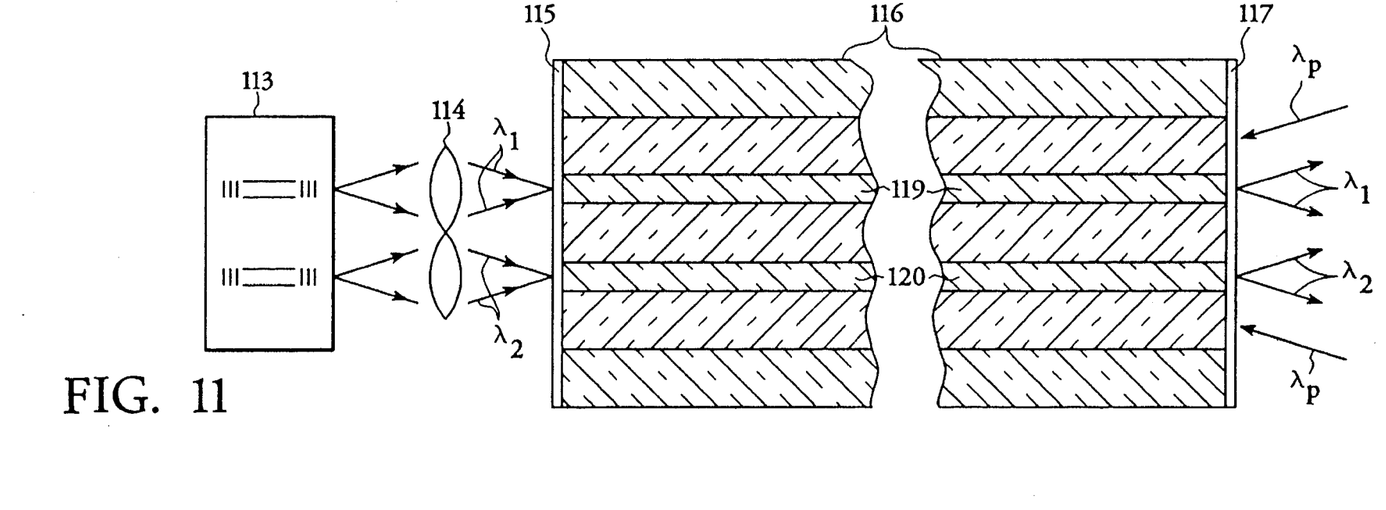
FIG. 11 is a side sectional view of end portions of another fiber amplifier of the present invention.

In FIG. 11, the distinct laser diodes 101 and 102 and beamsplitter 103 of FIG. 9 are replaced with a multi-wavelength laser diode array 113. A fiber lightguide array could also be used as the multiple wavelength signal source. The light from the laser diode array 113 of wavelengths $\lambda_1$ and $\lambda_2$ is coupled into respective cores 119 and 120 of the fiber amplifier 116 by means of a lens array 114 focusing each emitted beam onto the end 115 of the fiber 116. The pump light of wavelength $\lambda_p$ may be injected into the inner cladding region of the fiber 116 through the output end 117, as in FIG. 9. The amplified light of wavelengths $\lambda_1$ and $\lambda_2$ is emitted from the fiber cores 119 and 120 through the output end 117 of the fiber 116, as in FIG. 9.

In FIGS. 10 and 11, the fiber cores may be doped with erbium, for example. In that case, the pump light should be at about $\lambda_p$=980 nm. The signal light may then be at $\lambda_1$=1.53 µm and $\lambda_2$=1.54 µm, for example. Other rare earth elements, such as neodymium, thullium or praseodymium, could also be used as dopants for the core regions.

I claim:

1. An optical fiber comprising:

multiple nonconcentric core regions embedded within a common inner cladding, said core regions sufficiently spaced apart to allow independent operation of said core regions with minimal light interaction, all of said core regions doped with one or more active ionic species and all of said core regions when excited by pump light producing optical gain via stimulated emission of optical radiation propagating within each of said core regions.

2. The optical fiber of claim 1 further comprising reflection means for providing reflective feedback of said optical radiation propagating within each of said core regions to establish resonant laser cavities for all of said core regions.

3. The optical fiber of claim 1 wherein said multiple core regions are excited by pump light of multiple wavelengths.

4. The optical fiber of claim 1 wherein each core region supports propagation of only a single spatial mode of optical radiation therein.

5. An optical fiber comprising:

at least two nonconcentric core regions embedded within lower refractive index material and doped with an ionic species that produces optical gain via stimulated emission when excited by pump light, means for optically pumping said core regions, means for coupling external optical radiation received from outside of the optical fiber into at least one of said core regions, said at least one core region amplifying said received optical radiation coupled thereto and propagating therein, and means for suppressing reflective feedback of said amplified optical radiation in said at least one core region.

6. The optical fiber of claim 5 wherein a second of said at least two nonconcentric core regions has reflective feedback means for providing laser oscillation in that second core region, said second core region being evanescently coupled to said at least one core region receiving said external radiation, whereby said second core region forms an integral pumping means for said at least one core region.

7. The optical fiber of claim 5 wherein multiple core regions receive external optical radiation via said coupling means and amplify said received radiation.

8. An optical fiber comprising, multiple nonconcentric core regions embedded within lower refractive index cladding material, all of said core regions doped with one or more active ionic species and all of said core regions being capable, when excited by pump light, of producing optical gain via stimulated emission of optical radiation propagating within each of said core regions, said different ones of said multiple core regions being doped with at least two different active ionic species.

9. An optical fiber comprising, multiple nonconcentric core regions embedded within lower refractive index cladding material, all of said core regions doped with one or more active ionic species and all of said core regions being capable, when excited by pump light, of producing optical gain via stimulated emission of optical radiation propagating within each of said core regions, at least one core region supporting multiple spatial modes of propagation of optical radiation therein.

10. An optical fiber comprising, multiple nonconcentric core regions embedded within lower refractive index cladding material, all of said core regions doped with one or more active ionic species and all of said core regions being capable, when excited by pump light, of producing optical gain via stimulated emission of optical radiation propagating within each of said core regions, neighboring core regions producing optical gain of optical radiation propagating therein being located close enough to each other to permit evanescent coupling of said optical radiation between said neighboring core regions to establish phase locking of said optical radiation, and reflection means for providing reflective feedback of said optical radiation propagating within each of said core regions to establish resonant laser cavities for all of said core regions.

11. An optical fiber comprising, multiple nonconcentric core regions embedded within lower refractive index cladding material, at least two of said core regions doped with one or more active ionic species capable, when excited by pump light, of producing optical gain via stimulated emission wherein said cladding material forms a double cladding structure with an inner cladding surrounding each core region and an outer cladding of lower refractive index than the cladding material forming said inner cladding, said outer cladding embedding said inner cladding material.

12. A fiber gain medium comprising:

an optical fiber having multiple nonconcentric core regions each doped with an active ionic species, all of said core regions being capable, when excited by pump light, of providing optical amplification of light propagating within each of said core regions, each core region being embedded within a lower refractive index cladding region of said optical fiber, at least one of said core regions forming a laser cavity and evanescently coupled to at least one adjacent core region to provide high flux pumping thereto, said at least one adjacent core region comprising an optical amplifier having an injected light signal amplified by said evanescently coupled high flux pumping, and means for providing and coupling pump light into said optical fiber.

13. The fiber medium of claim 12 further comprising reflection means for providing laser oscillation within all of said core regions of said optical fiber.

14. The fiber medium of claim 12 wherein each core region supports only a single spatial mode of light propagation therein.

15. The fiber medium of claim 12 wherein said core regions have circular cross-sections.

16. The fiber medium of claim 12 wherein each said cladding region has a rectangular cross-section.

17. The fiber medium of claim 12 wherein all of said core regions are embedded within the same cladding region.

18. The fiber medium of claim 12 wherein said multiple core regions are arranged in a linear configuration.

19. The fiber medium of claim 12 further comprising a lens positioned in a path of light output from all of said multiple core regions of said optical fiber for imaging said output light.

20. The fiber medium of claim 12 further comprising a lens array having a plurality of lens elements positioned in respective paths of light elements output from said multiple core regions for individually collimating each light element, and a focusing lens positioned in a path of all of said collimated light elements for producing a single high brightness diffraction-limited focused light spot.

21. The fiber medium of claim 12 wherein all of said core regions are doped with the same active ionic species.

22. The fiber medium of claim 21 wherein said active ionic species is an upconverting ionic species.

23. A fiber gain medium comprising, an optical fiber having multiple nonconcentric core regions each doped with an active ionic species, all of said core regions being capable, when excited by pump light, of providing optical amplification of light propagating within each of said core regions, each said core region being embedded within a lower refractive index cladding region of said optical fiber, at least one core region supporting multiple spatial modes of light propagation therein, and means for providing and coupling pump light into said optical fiber.

24. A fiber gain medium comprising, an optical fiber having multiple nonconcentric core regions each doped with an active ionic species, all of said core regions having elliptical cross-sections and all of said core regions being capable, when excited by pump light, of providing optical amplification of light propagating within each of said core regions, each said core region being embedded within a lower refractive index cladding region of said optical fiber, and means for providing and coupling pump light into said optical fiber.

25. A fiber gain medium comprising, an optical fiber having multiple nonconcentric core regions each doped with an active ionic species, all of said core regions having rectangular cross-sections and all of said core regions being capable, when excited by pump light, of providing optical amplification of light propagating within each of said core regions, each said core region being embedded within a lower refractive index cladding region of said optical fiber, and means for providing and coupling pump light into said optical fiber.

26. A fiber gain medium comprising, an optical fiber having multiple nonconcentric core regions each doped with an active ionic species, all of said core regions being capable, when excited by pump light, of providing optical amplification of light propagating within each of said core regions, each said core region being embedded within a lower refractive index cladding region of said optical fiber and each said cladding region having a circular cross-section, and means for providing and coupling pump light into said optical fiber.

27. A fiber gain medium comprising, an optical fiber having multiple nonconcentric core regions each doped with an active ionic species, all of said core regions being capable, when excited by pump light, of providing optical amplification of light propagating within each of said core regions, each said core region being embedded within a lower refractive index cladding region of said optical fiber and each said cladding region having an elliptical cross-section, and means for providing and coupling pump light into said optical fiber.

28. A fiber gain medium comprising, an optical fiber having multiple nonconcentric core regions each doped with an active ionic species, all of said core regions being capable, when excited by pump light, of providing optical amplification of light propagating within each of said core regions, each said core region being embedded within a lower refractive index cladding region of said optical fiber, all of said core regions being embedded within the same cladding region, said cladding region embedding said multiple core regions being embedded within an outer cladding of said fiber, and means for providing and coupling pump light into said optical fiber.

29. The fiber medium of claim 17 wherein said core regions are arranged symmetrically with respect to a center of said cladding region embedding said core regions.

30. The fiber medium of claim 17 wherein said core regions are arranged non-centrosymmetrically within said cladding region embedding said core regions.

31. The fiber medium of claim 17 wherein neighboring core regions are spaced close enough relative to a refractive index difference between said core regions and said cladding region such that phase locking of light propagating within said neighboring core regions occurs.

32. The fiber medium of claim 17 wherein neighboring core regions are spaced far enough apart such that light propagating within said core regions interacts only minimally.

33. A fiber gain medium comprising, an optical fiber having multiple nonconcentric core regions each doped with an active ionic species capable, when excited by pump light, of undergoing optical amplification, each said core region being embedded within a lower refractive index cladding region of said optical fiber, and wherein each core region is embedded within a separate cladding region, each cladding region embedding a core region being, in turn, embedded within an outer cladding of said fiber, and means for providing and coupling pump light into said optical fiber.

34. The fiber medium of claim 33 wherein each core region is centered within its respective cladding region.

35. The fiber medium of claim 33 wherein each core region is positioned off-center within its respective cladding region.

36. A fiber gain medium comprising, an optical fiber having multiple nonconcentric core regions each doped with an active ionic species, said multiple core regions being arranged in a closely spaced hexagonal configuration and all of said core regions being capable, when excited by pump light, of providing optical amplification of light propagating within each of said core regions, each said core region being embedded within a lower refractive index cladding region of said optical fiber, and means for providing and coupling pump light into said optical fiber.

37. A fiber gain medium comprising, an optical fiber having multiple nonconcentric core regions each doped with an active ionic species capable, when excited by pump light, of undergoing optical amplification, each said core region being embedded within a lower refractive index cladding region of said optical fiber, and wherein at least two of said core regions are doped with different active ionic species, and means for providing and coupling pump light into said optical fiber.

38. The fiber medium of claim 37 wherein at least one of said active ionic species is an upconverting ionic species.

39. The fiber medium of claim 37 wherein said pump light providing and coupling means permits simultaneous excitation of each different active ionic species.

40. The fiber gain medium of claim 37 wherein said pump light providing and coupling means includes means for independently selecting at least one pump source corresponding to at least one of said active ionic species so as to independently excite said core regions with different active ionic species.

41. The fiber gain medium of claim 37 wherein said means for providing pump light couples light of different wavelengths into cores with different active ionic species.

42. The fiber gain medium of claim 37 further comprising means for coupling external optical radiation of different wavelengths into cores of said fiber with different active ionic species.

43. The fiber gain medium of claim 37 further comprising means for providing reflective feedback of optical radiation propagating in said core regions to establish resonant laser cavities for said core regions, core regions with different active ionic species generating laser light of different wavelengths.

44. A fiber gain medium comprising, an optical fiber having multiple nonconcentric core regions each doped with an active ionic species, all of said core regions being capable, when excited by pump light, of providing optical amplification of light propagating within each of said core regions, each said core region being embedded within a lower refractive index cladding region of said optical fiber, means for providing and coupling pump light into said optical fiber, means for coupling light received from an optical signal source outside of said optical fiber into at least one of said core regions, said at least one core region amplifying said received light coupled thereto and propagating therein, and means for suppressing reflective feedback of said amplified light.

45. The fiber medium of claim 44 wherein a first core region is coupled to receive said light from said optical signal source and another core region is evanescently coupled directly to said first core region, both core regions being excited by pump light and both core regions producing optical gain of said light from said optical signal source.

46. The fiber medium of claim 44 wherein a first optical signal source is coupled to one of said core regions at one end of said optical fiber and a second optical signal source is coupled to another of said core regions at an opposite end of said optical fiber.

47. A monolithically integrated fiber laser array, comprising:

a single optical fiber medium with multiple nonconcentric core regions incorporated therein, all of said core regions doped with an active lasing ionic species to form a light emitting laser element in an array of such laser elements, reflection means associated with said optical fiber medium for defining a laser cavity within all of said core regions of said fiber medium, said core regions in said fiber medium sufficiently close that light propagating within said core regions interacts with adjacent core regions forming a phase-locked array of said laser elements, and optical pump means for exciting said active lasing ionic species in all of said core regions to lasing action.

48. The fiber laser array of claim 47 wherein all of said core regions are doped with the same active lasing ionic species.

49. The fiber laser array of claim 47 wherein different core regions are doped with at least two different active lasing ionic species.

50. The fiber laser array of claim 47 wherein all of said core regions are embedded within a common cladding region of said fiber medium.

51. The fiber laser array of claim 47 wherein said optical pump means excites all of said core regions simultaneously.

52. The fiber laser array of claim 47 wherein at least two different sets of core regions are separately embedded within different cladding regions of said fiber medium.

53. A monolithically integrated fiber laser array, comprising, a single optical fiber medium with multiple nonconcentric core regions incorporated therein, all of said core regions doped with an active lasing ionic species to form a light emitting laser element in an array of such laser elements, said fiber medium comprising a double clad optical fiber, reflection means associated with said optical fiber medium for defining a laser cavity within all of said core regions of said fiber medium, and optical pump means for exciting said active lasing ionic species in all of said core regions to lasing action.

54. A monolithically integrated fiber laser array comprising a single optical fiber medium with multiple nonconcentric core regions incorporated therein, each core region doped with an active lasing ionic species to form a light emitting laser element in an array of such laser elements, different sets of core regions being separately embedded within different cladding regions of said fiber medium, reflection means associated with said optical fiber medium for defining a laser cavity within each core region of said fiber medium, and optical pump means for exciting said active lasing ionic species in said core regions to lasing action, said optical pump means separately pumping each different cladding region, whereby each set of core regions is independently excitable to lasing action.

55. The fiber laser array of claim 54 wherein core regions embedded within different cladding regions are doped with at least two different active ionic species.

56. The fiber laser array of claim 55 wherein said optical pump means provides pump light of different wavelengths to cladding regions associated with core regions having different active ionic species.

57. The fiber laser array of claim 56 wherein said optical pump means provides independent excitation of core regions having different active ionic species.

* * * * *